Jan. 4, 1927.
B. FRANCIS
1,613,091
FLYING MACHINE OF THE BIPLANE TYPE
Filed July 1, 1926     2 Sheets-Sheet 1
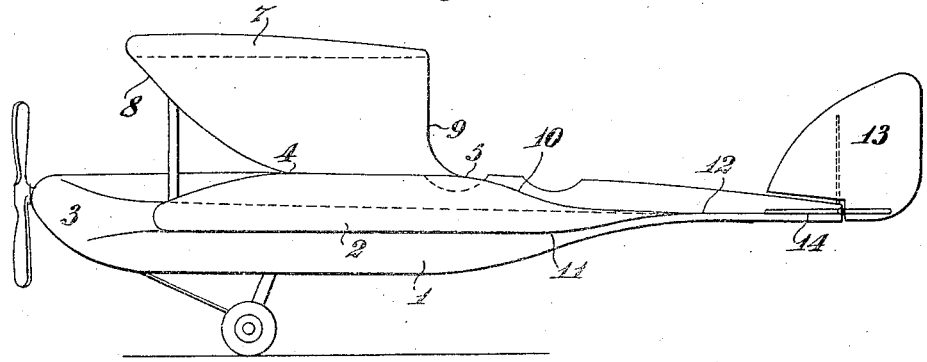
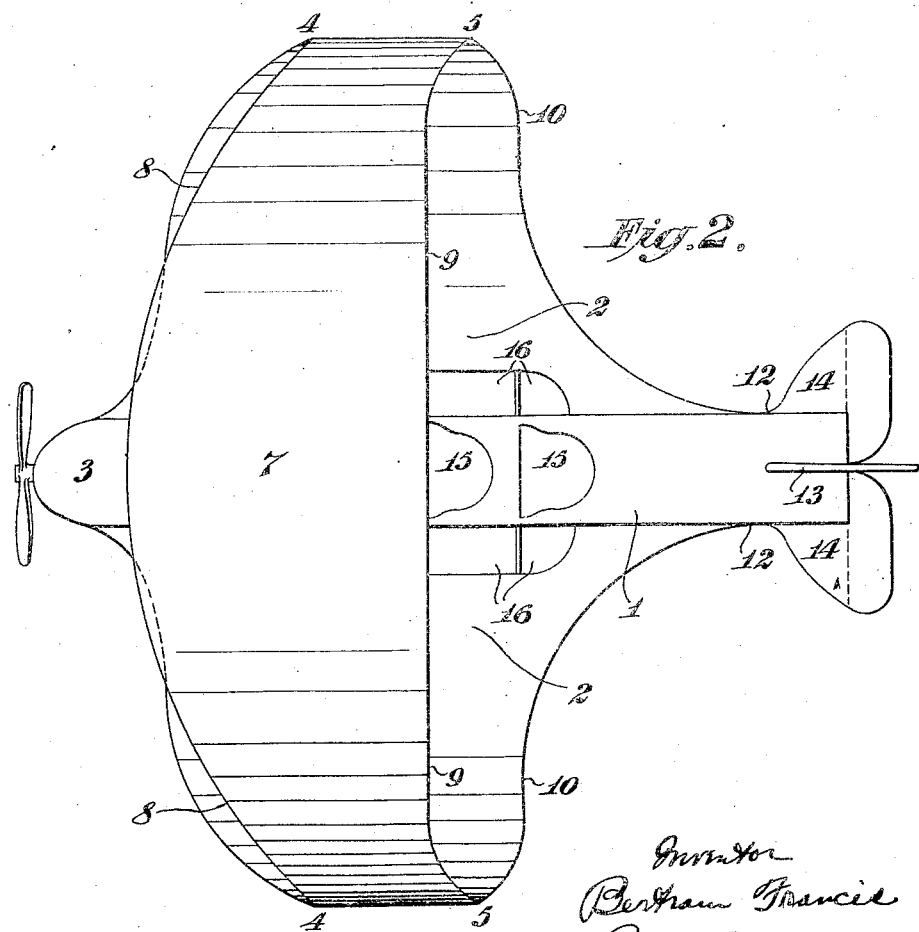

Jan. 4, 1927.
B. FRANCIS
1,613,091
FLYING MACHINE OF THE BIPLANE TYPE
Filed July 1, 1926      2 Sheets-Sheet 2
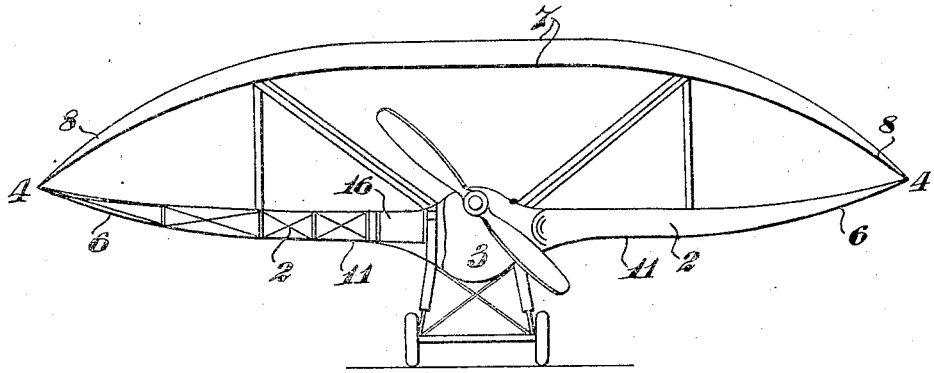
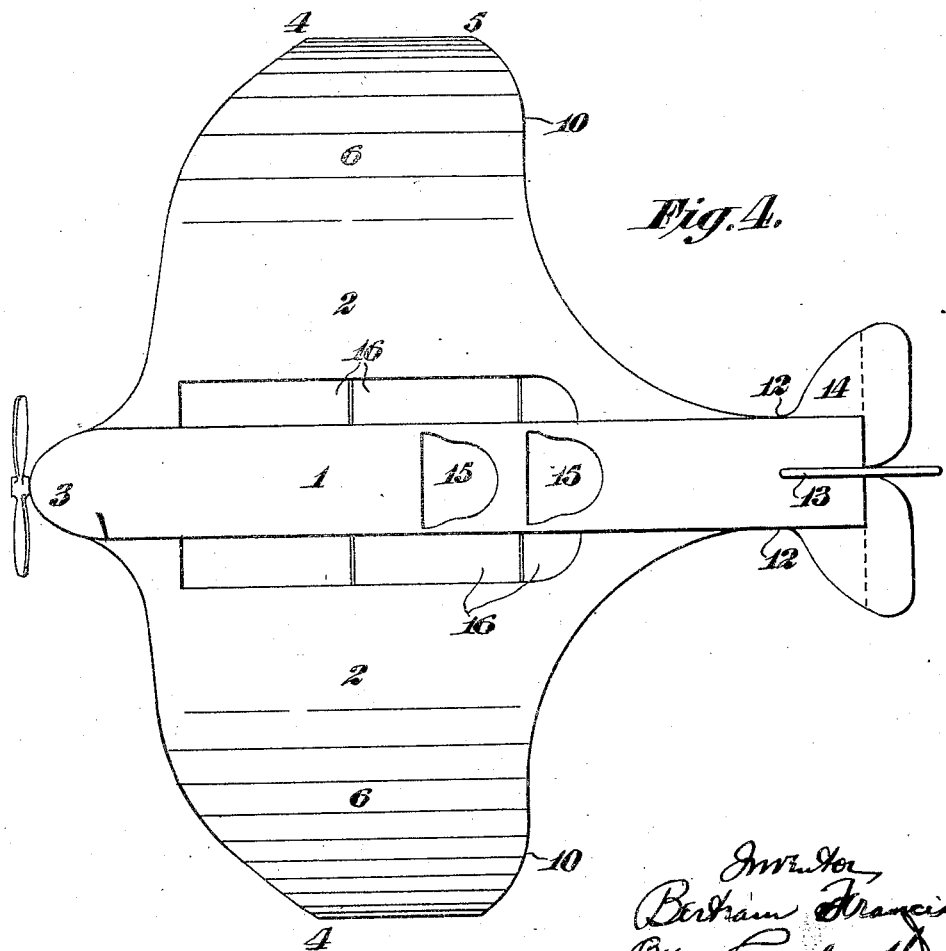

Patented Jan. 4, 1927.

1,613,091

UNITED STATES PATENT OFFICE.

BERTRAM FRANCIS, OF KISII, AFRICA.

FLYING MACHINE OF THE BIPLANE TYPE.

Application filed July 1, 1926, Serial No. 119,947, and in Great Britain April 7, 1925.

My invention which relates to flying machines of the bi-plane type, has for its object to provide for greater stability and perfect gliding of the machine whilst in flight, and to prevent the possibility of nose-diving and crashing, by a peculiar arrangement and formation of wings.

The invention relates more particularly to flying machines with boat-like fuselage provided with two superimposed sustaining planes (bi-plane) which meet and are joined together at their tips or outer ends. In the above connection, a machine has been proposed in which the upper sustaining plane extended in an horizontal plane, whilst the lower sustaining plane was curved upwards in a circular curve, the fuselage and the side wings or planes and the tail planes and the top plane being so shaped and arranged that, when viewed from above, they simulated a bird with outstretched wings and tail.

It is also known that flying machines with boat-like fuselage have been provided with two superimposed sustaining planes which were curved in cross-section and approached one another either side, both sustaining planes being upwardly arched but not joining one another at their tips or outer ends, that is to say, the top sustaining plane was of less span than the lower sustaining plane, or vice versa.

According to my said invention, the fuselage and the side wings or planes and the tail planes are so shaped and arranged that, when viewed from above, they simulate a bird with outstretched wings and tail, and in conjunction with the above there is employed a single upper plane or wing which, when viewed from the front, is of arcuate shape, tapering off towards the outer ends thereof, and, when viewed from above, is of the shape of a more or less segmental portion of a circle, but with its ends or tips cut off parallel with the longitudinal axis of the fuselage.

These straight portions of the upper plane or wing, which upper plane or wing cambers from front to back, meet and are connected to corresponding straight portions at the outer ends of the lower planes or wings carried by the fuselage, which lower planes or wings taper to a line and are upwardly curved, and are cambered from front to back and gradually merge to a fine point at the tail end of the fuselage, the undersurfaces of the lower planes or wings being flat.

In order that the invention may be the more readily understood, reference is to be had to the following description and accompanying sheets of drawings, wherein:—

Figure 1 is a side view of a flying machine with planes arranged in the manner set forth.

Figure 2 is a top plan view thereof.

Figure 3 is a front view, partly in section, of said aeroplane; and,

Figure 4 is a view similar to Figure 2, but with the top plane removed.

Like numerals of reference indicate corresponding parts in the several figures.

In carrying out the invention and referring to the drawings, 1 represents the fuselage, and 2 the side wings or planes, carried thereby and which fuselage and side wings or planes are formed in one and constitute an integral whole, said side wings or planes 2 merging into the nose 3 of said fuselage and sweep outwardly and backwardly and terminate in a straight portion 4—5 of the upwardly curved outer portions 6 of said planes 2.

7 represents the upper wing or plane which is strutted or supported from the fuselage 1 and planes 2 in any suitable manner, and whose front edge 8 sweeps backwardly and downwardly, and whose back edge 9 sweeps downwardly and backwardly to meet the straight edge portions 4—5 of the planes 2. The upper edges of said planes 2, from the points 5 sweep backwardly as indicated at 10 and meet with the undersurface 11 thereof and are carried in a straight line 12 to the end of the tail of the fuselage, and to which tail is pivotally mounted the rudder 13 and tail planes 14, 15, 15 are the usual cock-pits for pilot and observer, and 16 represent compartments for passengers, luggage, petrol tanks, tools or other requirements formed in the body of the wings or planes 2.

When losing flying speed, the machine cannot nose-dive, but dips slightly and glides forward at an angle slightly below horizontal, giving the pilot ample time in which to recover.

As the fuselage and planes carried thereby are formed and constructed in an air and watertight manner, there is no fear of the machine sinking if landed on water, and the machine can be readily converted into a seaplane or amphibian.

I claim:—

A flying machine with boat-like fuselage and two superimposed sustaining planes, characterized in that the upper plane, when viewed from the front, is of arcuate shape and cambers back from front to back and tapers off towards the outer ends thereof, and when viewed from above is of a shape of a more or less segmental portion of a circle, but with its ends or tips cut off parallel with the longitudinal axis of the fuselage, and that the lower sustaining plane or wings are cambered from front to back and curve upwardly and taper outwardly, terminating in and joining each of the upper wing tips in a common straight line, and the upper and lower surfaces gradually merging into a straight line.

In testimony whereof I have affixed my signature hereto this 25th day of May, 1926.

BERTRAM FRANCIS.